(12) United States Patent
Cha et al.

(10) Patent No.: US 8,213,773 B1
(45) Date of Patent: Jul. 3, 2012

(54) APPARATUS AND METHOD FOR ZOOMABLE ON-LINE VIDEO

(76) Inventors: Joseph S. Cha, S. Pasadena, CA (US); Josh Courtney, Seattle, WA (US); Heath Carlisle, Alameda, CA (US)

( * ) Notice: Subject to any disclaimer, the term of this patent is extended or adjusted under 35 U.S.C. 154(b) by 335 days.

(21) Appl. No.: 12/706,705

(22) Filed: Feb. 16, 2010

Related U.S. Application Data

(60) Provisional application No. 61/207,565, filed on Feb. 13, 2009.

(51) Int. Cl.
    *G11B 27/00* (2006.01)
(52) U.S. Cl. ........................................ 386/278
(58) Field of Classification Search .................. None
    See application file for complete search history.

(56) References Cited

OTHER PUBLICATIONS http://www.zinio.com/, 1 page printout from Internet Website, on Jun. 12, 2010.
https://www.zinio.com/account/download-reader-page.jsp, 2 page printout from Internet Website, on Jun. 12, 2010.
http://platform.idiomag.com/2009/05/top-magazine-iphone-apps/; 18 page printout from Internet Website, on Jun. 12, 2010.

*Primary Examiner* — William C Vaughn, Jr.
*Assistant Examiner* — Eileen Adams
(74) *Attorney, Agent, or Firm* — Law Office of David Hong

(57) ABSTRACT

This invention relates to an apparatus and method for presenting zoom-able video via the Internet.

5 Claims, 11 Drawing Sheets

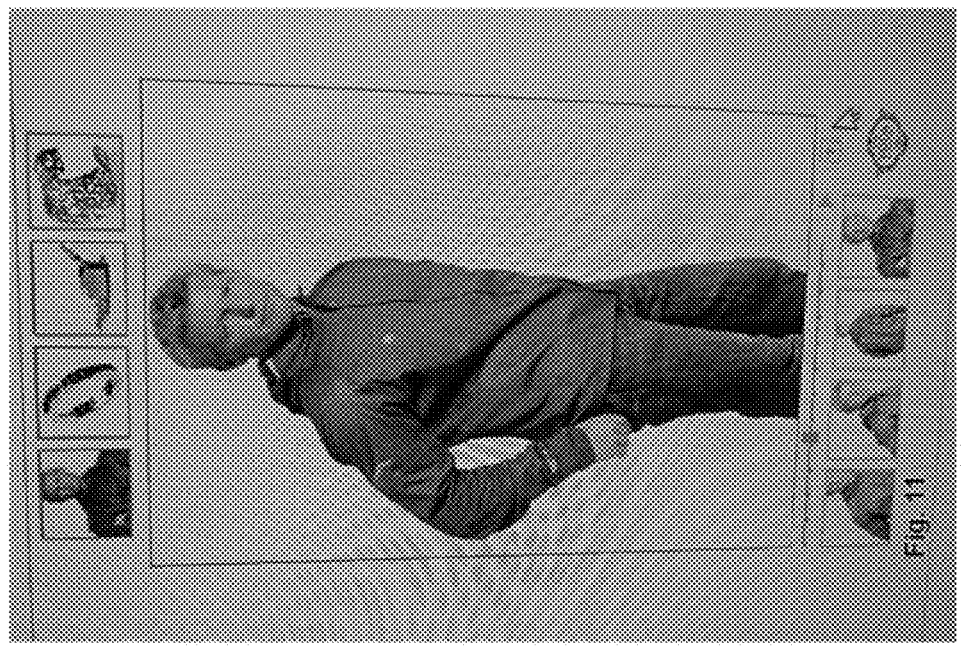
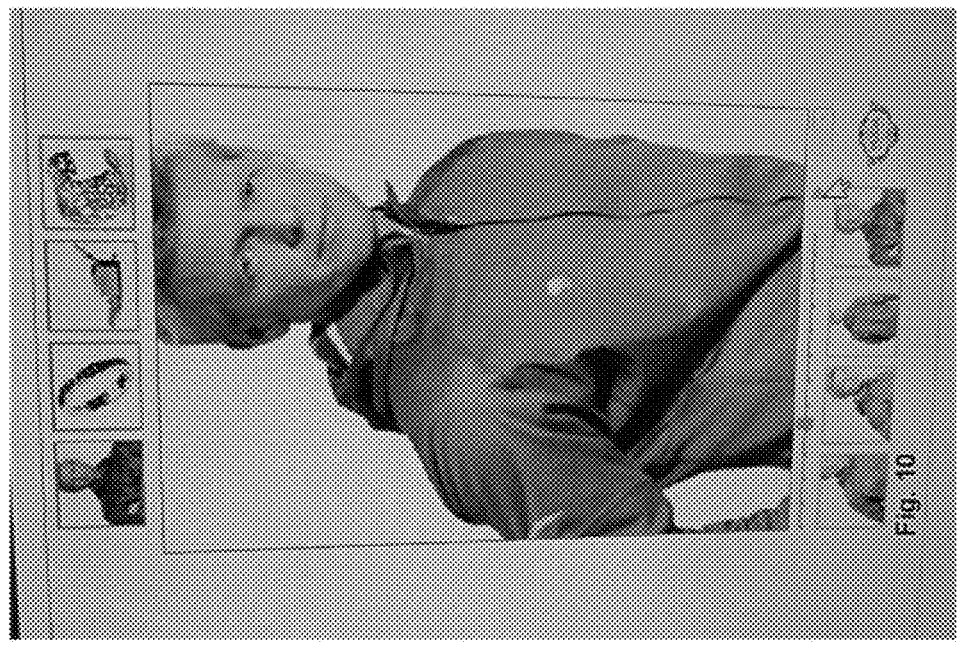

APPARATUS AND METHOD FOR ZOOMABLE ON-LINE VIDEO

This application claims the benefit of U.S. Provisional Patent Application No. 61/207,565, filed on Feb. 13, 2009, which is incorporated by reference in entirety.

BACKGROUND OF THE INVENTION

1. Field of the Invention

This invention relates to an apparatus and method for presenting zoom-able video via the Internet; in addition, this invention allows the zoom-able video to be targetable and "draggable" with a pointing implement or device or finger (i.e. a finger on an iPhone or other multi-touch computing device) via the Internet.

2. Description of the Prior Art

Prior to the present invention, Internet websites presented still photos and stationary images of products and video of products. Users could focus and expand the view of the still photos and the size of the video screen or player. However, there were no services or abilities to focus and to expand moving pictures, moving images, moving photos and video.

From the preceding descriptions, it is apparent that the devices currently being used have significant disadvantages. Thus, important aspects of the technology used in the field of invention remain amenable to useful refinement.

SUMMARY OF THE INVENTION

In accordance with the invention, one of the purposes is to provide a way to view moving pictures, photos, images and video in close-up or zoom view or zoom out view of a person, subject, object or any other item to be recorded into an electronic medium.

The present invention introduces such refinement. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

However, the user has at least one or preferably four or more zoom target and alternate view areas. When the user points and selects one of these target areas, the player zooms in and runs the video (either forward or backwards, depending on where that zoom target is located in relation to the entire video).

This invention allows maximum display flexibility: on demand zoom in and zoom out function at any place of the video image and during the play of the video (i.e. time); also the user can place the mouse/pointer and focus in on a particular portion of the video. This invention also allows the user or programmer to selectively pick particular areas of the video (i.e. distinctive portions of a product video) to be highlighted.

The user can also use the plus/minus zoom buttons; alternatively, there could be other changes to particular portions of the video image (i.e. color, changes to garment color during the play of a video of male model or background of the video; face of the model or model itself, body type, race, gender, clothing; with CGI technology). The user can run the video forward and backwards.

Figure 9:
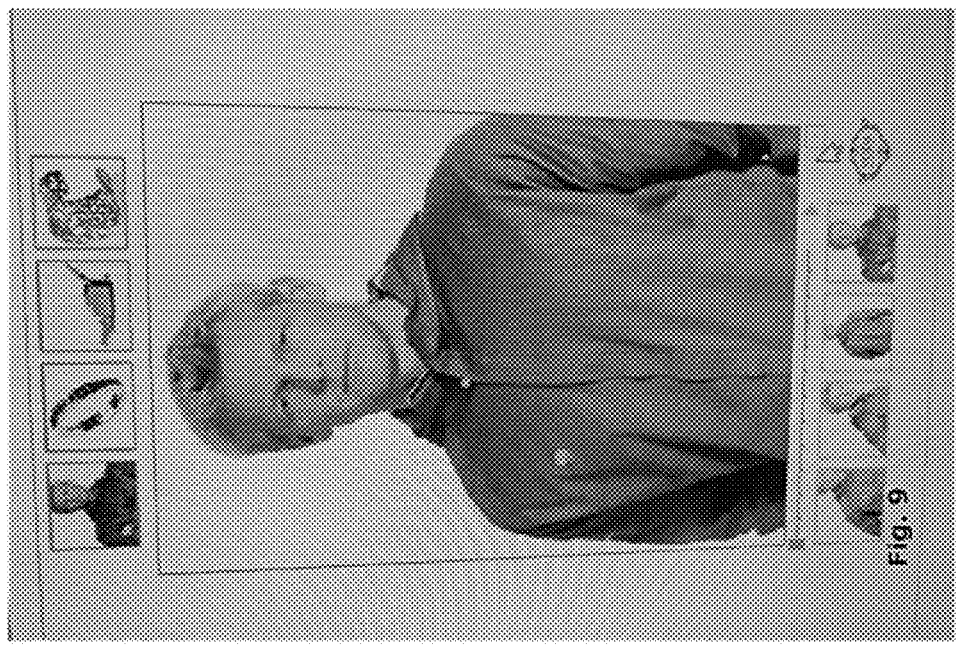
Figure 8:
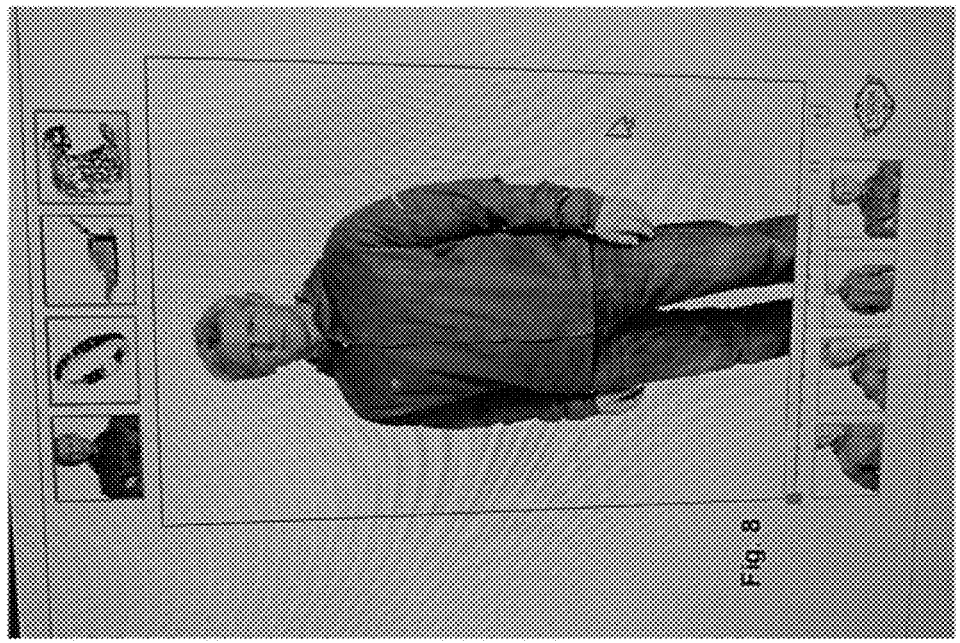
Figure 13:
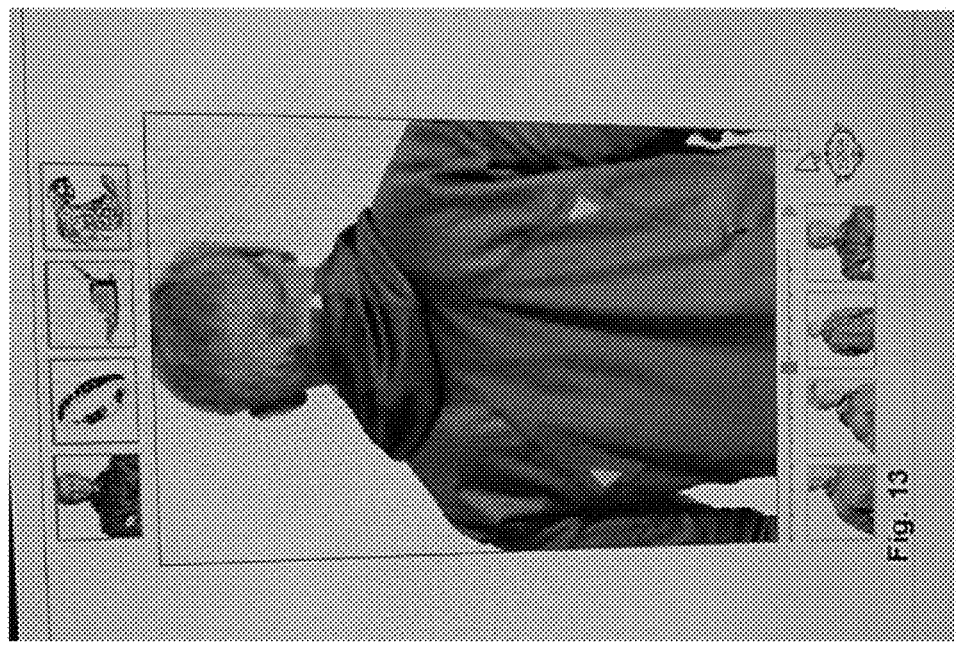
Figure 12:
Figure 15:
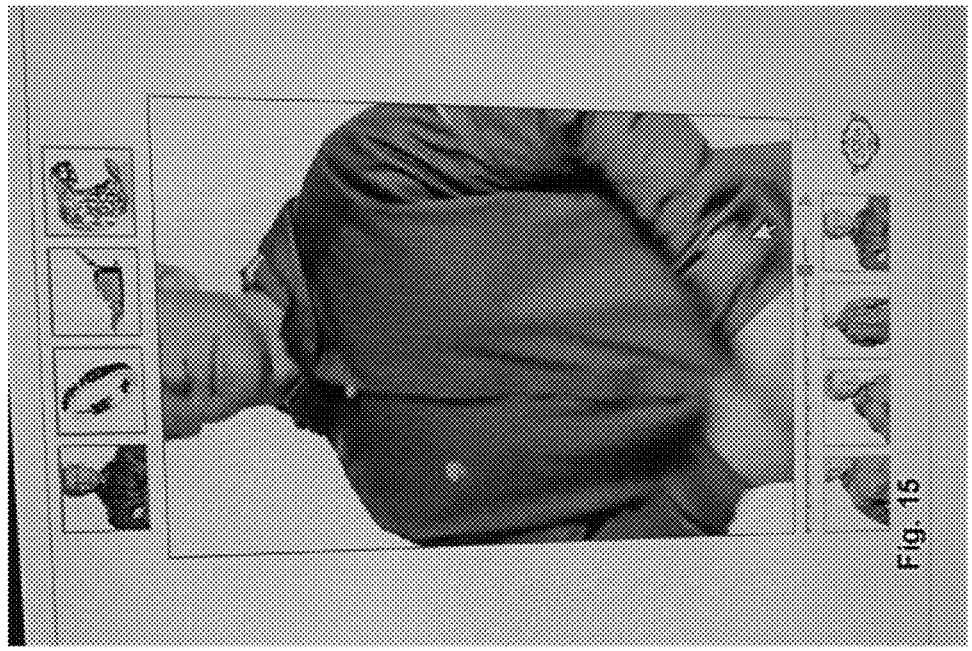
Figure 14:
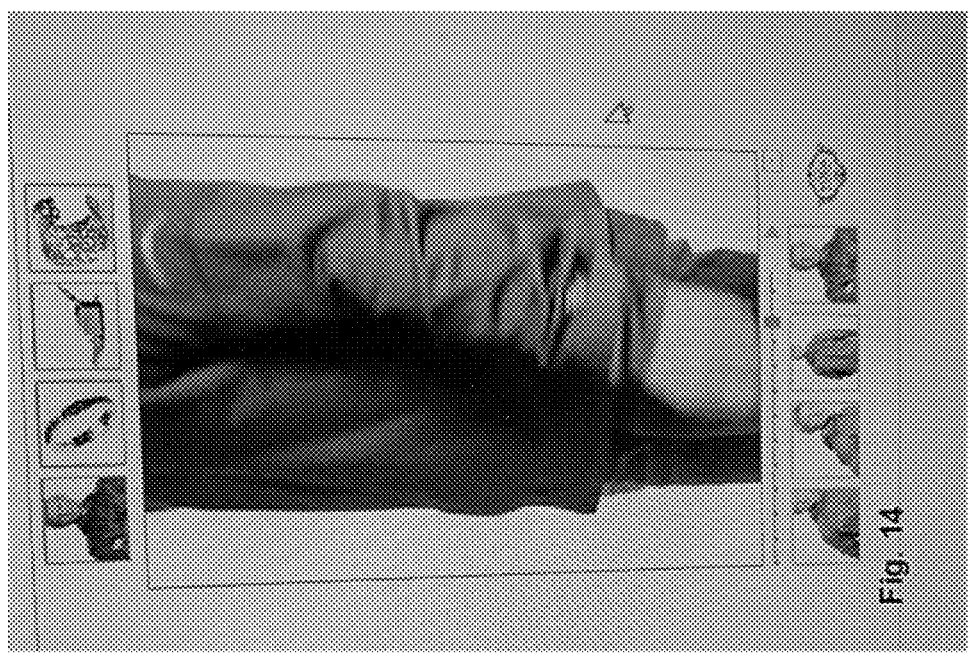

FIG. 8 to FIG. 15 are photos taken of the viewer player at various points along the video. FIG. 9 shows a zoom-in of the view from FIG. 8; FIG. 11 shows a zoom-out of the view from FIG. 10; FIG. 13 is a zoom-in of the view from FIG. 12. FIG. 14 and FIG. 15 show that the user can selectively move around the viewer screen to examine different parts of the viewed video or moving picture.

PARTS LIST FOR FIGURES

10 apparatus
15 video player area
20, 25 zoom in and out "buttons" for video player
30 play/pause "button" for video player
35 progress bar or indicator for video player
40 zoom target and alternative views selector "buttons"
45 subject video (original size)
50 axis point setting (x-axis, y-axis) for video player area
55 sample trademark or logo

DESCRIPTION OF THE PREFERRED EMBODIMENTS

Referring to FIGS. 1-15, there is illustrated an apparatus or method to manipulate the view of moving pictures or video, i.e. zoom in or zoom out, while the video is playing. Also, this allows zooming into the video file, i.e. a higher or lower magnification of the video file during playback. The file is simply playing, but the apparatus allows the user to zoom in and focus on the video file.

Figure 1:
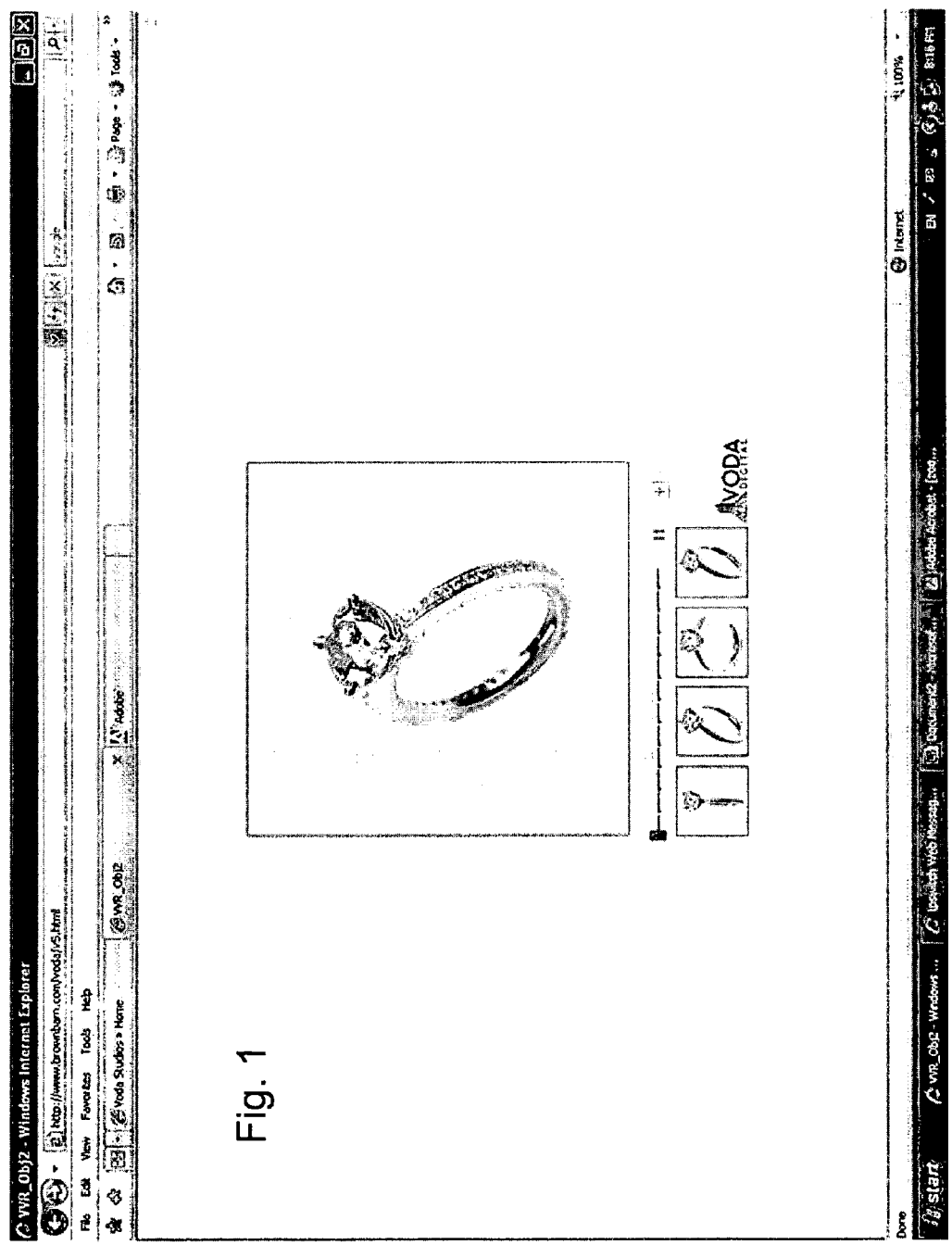
FIGS. 1-4 are screen shots of various images of the invention used to show a video of an engagement ring at different points of movement.
Figure 2:
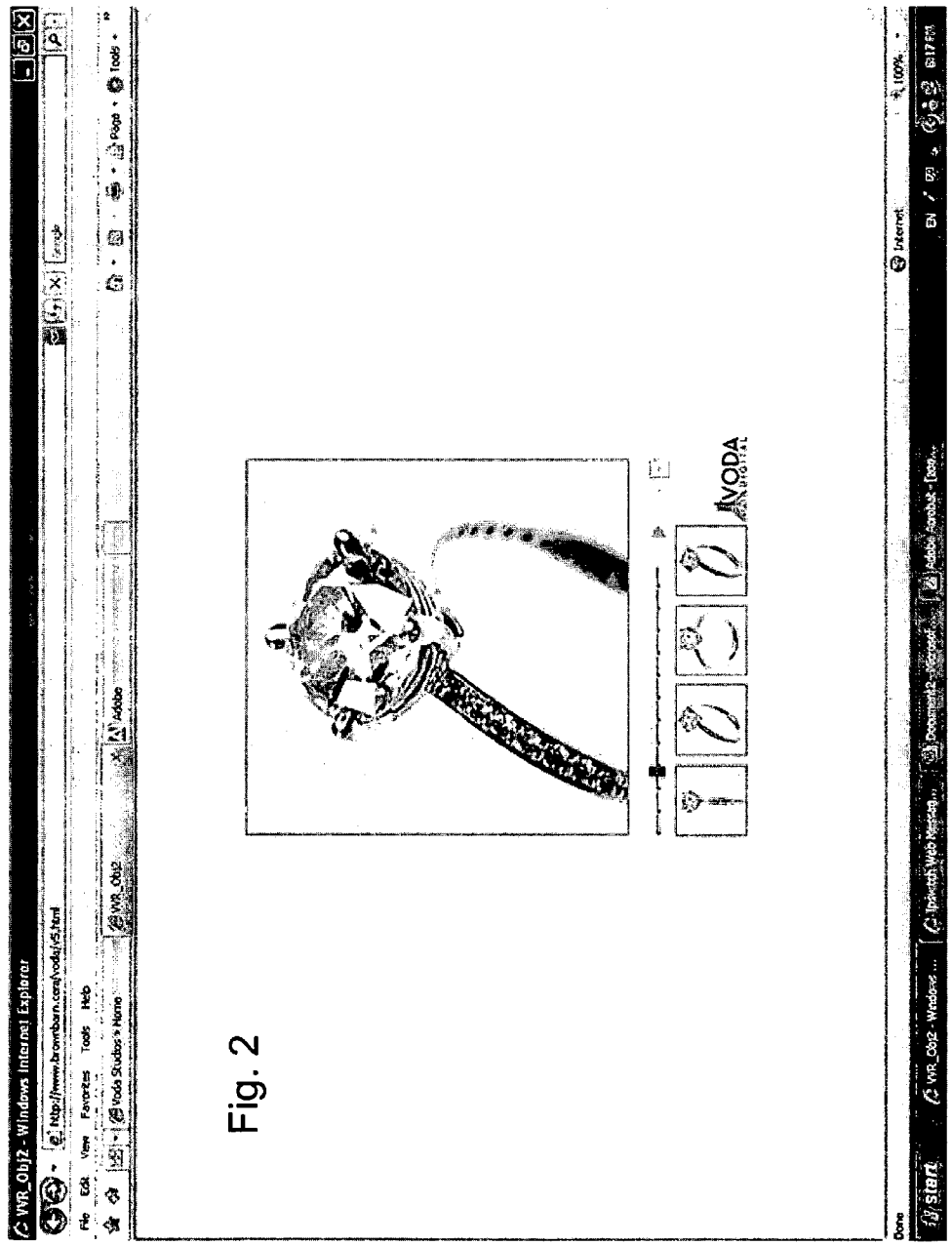
Figure 3:
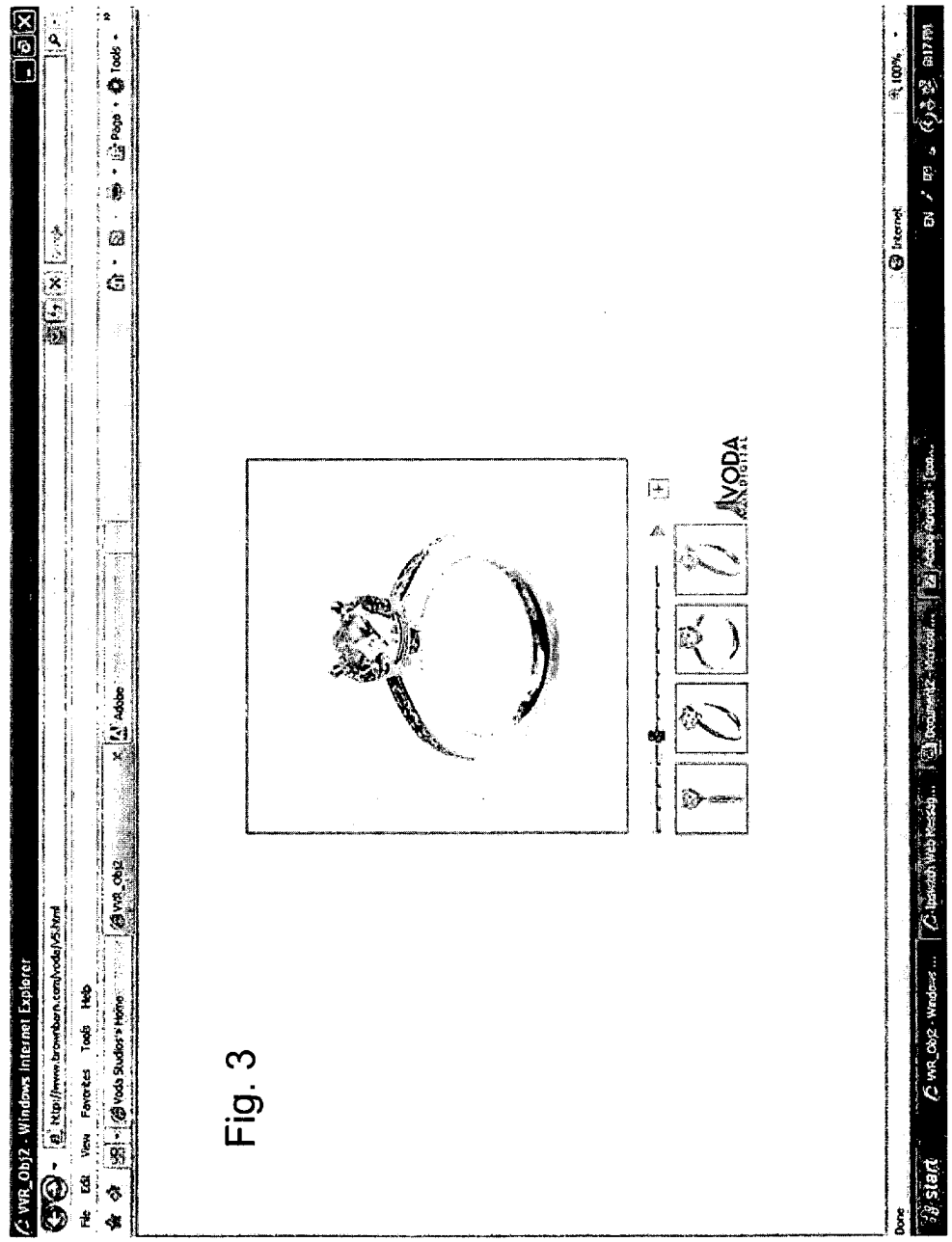
Figure 4:
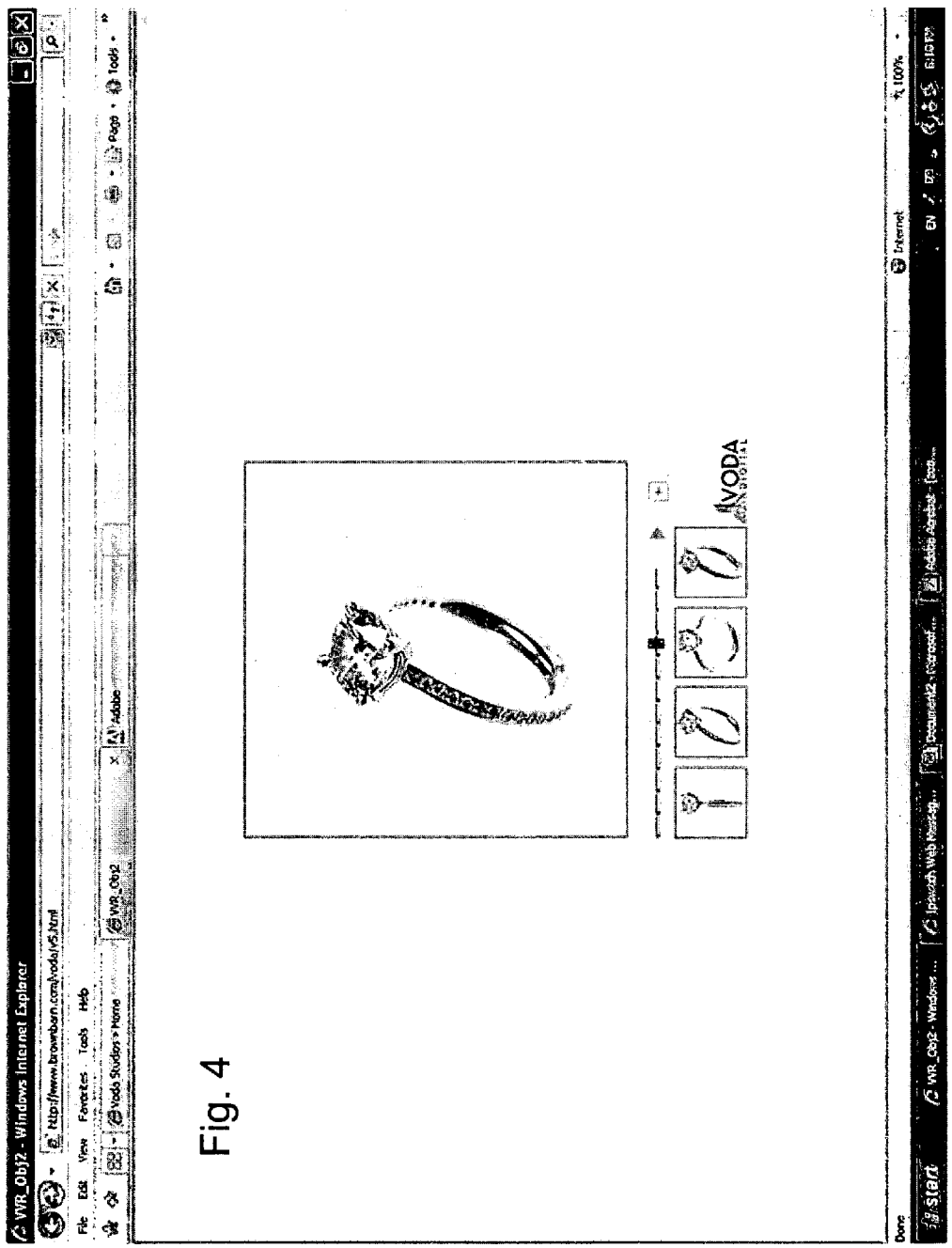
Figure 5:
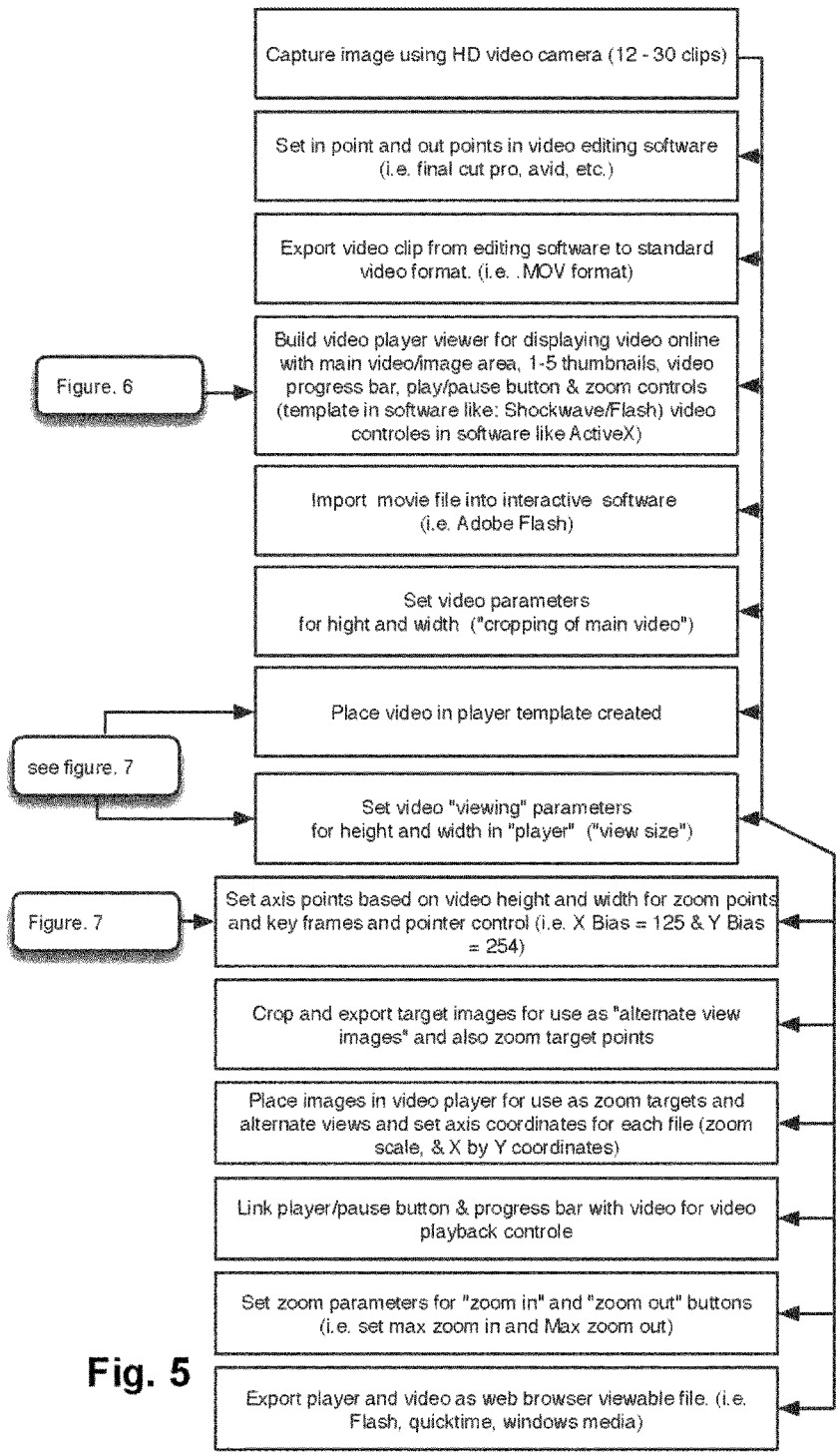
FIG. 5 is a flowchart of the method and process of this invention.
Figure 6:
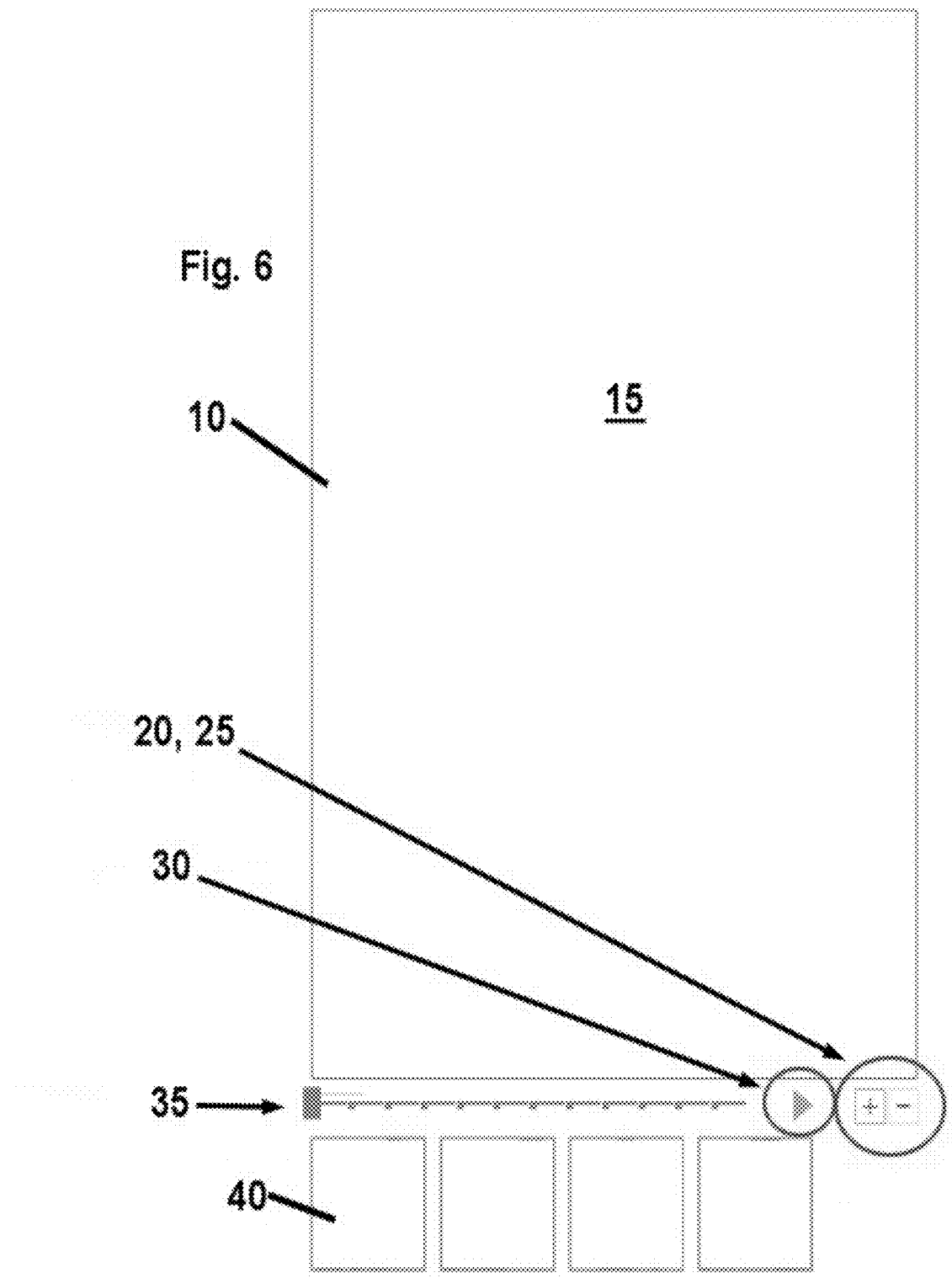
FIG. 6 is a diagram of one example of the invention, which shows the video player, zoom in and out buttons, play/pause button, progress bar, and zoom target and alternate view area. This example is not intended to be limiting, other feature buttons could also be included: color, light/dark, change environment color, background, etc.).
Figure 7:
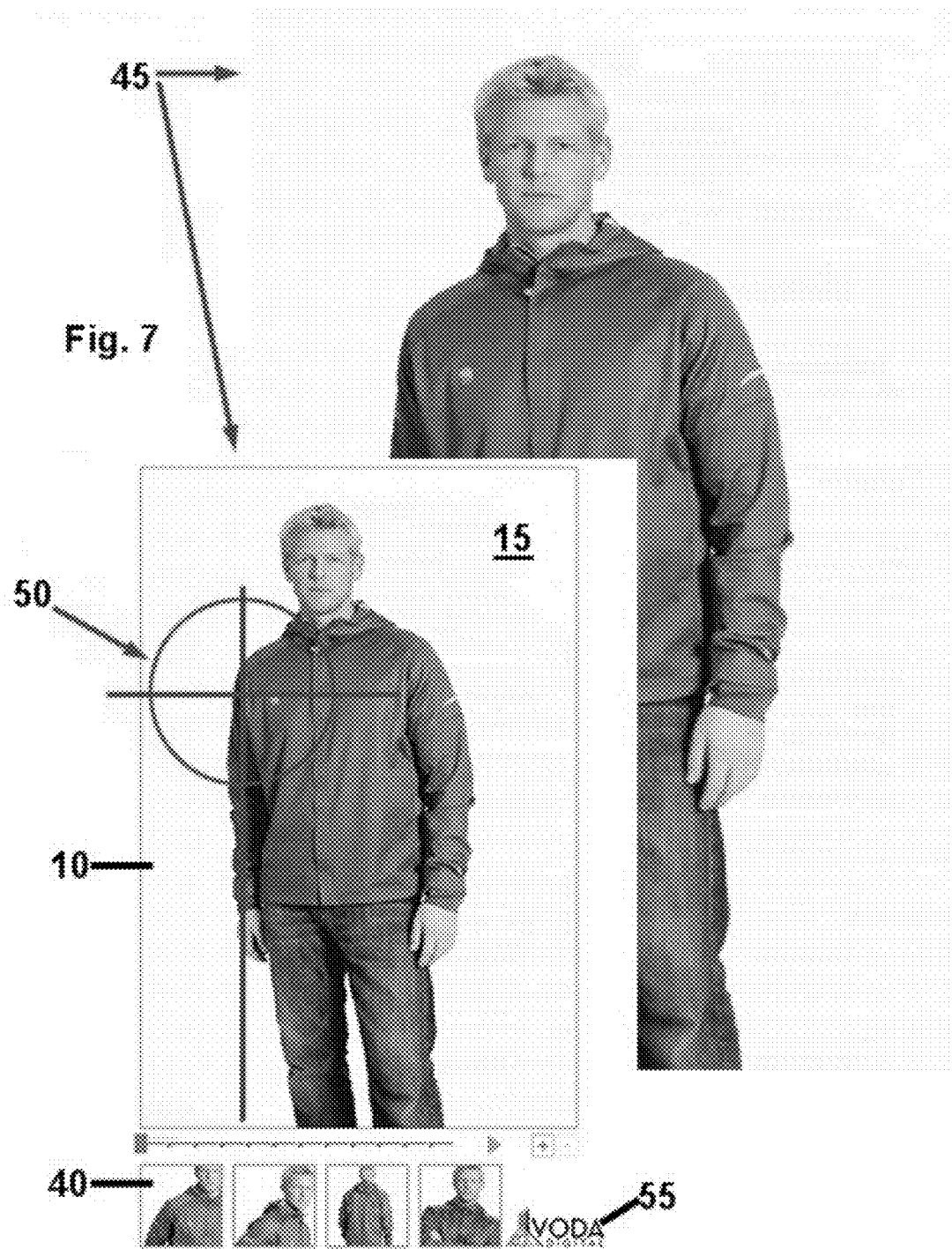
FIG. 7 is another example of the invention showing a video of a male model; we are setting the original video size and identifying a height/width parameter; then placing the video file into the player, which displays a minimum view of that video, i.e. resizing the video inside the player. So, the original video is actually playing inside the player, but a scaled down or minimum view is actually being shown.

Viewing the Flowchart on FIG. 5 of the Drawings:

1. Capture images using a video camera:

The first step is to shoot or capture the video of what is being presented. In one working prototype, the inventors shot video of a diamond ring on a turnstile device that rotated the ring three hundred and sixty degrees (FIGS. 1-4). Preferably, the inventors use a HD or high definition camera, and a high quality video is preferred, but this invention is not limited to use of a high quality video camera, and other input, information or data gathering devices can be used.

2. Set "in point" and "out points" in video editing software (i.e. final cut pro, avid, etc.); or simply beginning or end points of the video file.

3. Export video clip from editing software to standard video format (such as MOV format or any other desired video format).

4. Build or provide a video player viewer for displaying video online with main video/image area, 1-5 thumbnails, video progress bar, play/pause button & zoom control (template in software like: Shockwave/Flash) video controls in software like Active X).
5. Import movie file in interactive software (i.e. Adobe Flash).
6. Set video parameters for height and width ("cropping of main video").
7. Place video in player template created.
8. Set video "viewing" parameters for height and width in "player" ("view size").
9. Set axis points based on video height and width for zoom points and key frames and pointer control (i.e. X Bias=125 & Y Bias=254).
10. Crop and export target images for use as "alternate view images" and also zoom target points.
11. Place images in video player for use as zoom target and alternate views and set axis coordinates for each file (zoom scale and X by Y coordinates).
12. Link player/pause button & progress bar with video for video playback control.
13. Set zoom parameters for "zoom in" and "zoom out" buttons (i.e. set max zoom in and max zoom out).
14. Export player and video as web browser viewable file (i.e. Flash, Quicktime, or Windows Media).
15. Upload edited video file to web page server.

Entertainment Application:

If you are watching a movie or sports, one can zoom into particular portions of the moving pictures. For example, this invention would be very useful for instant replay for professional sports, such as basketball and football. Many times, having a tool to view whether a receiver's foot is on the line while the images are playing.

Assistance of E-Commerce Multi-Channel Markers

This apparatus helps the customer to see and to view the product for sale in motion, which enhances the selling experience and makes the product more vivid. This moving picture video allows the user to see detailed aspects of the product otherwise, which would not be seen or noticed in a still photo or picture or at a normal resolution.

For example, the prototype invention presented a diamond wedding engagement ring of one of the inventors. A video of a ring on a rotating base allows the user to see the diamond sparkle and gleam in the light, which heightens the marketing and presentation of the product for the perspective buyer.

Without being limiting, it is preferred that the native video or moving picture source be as high quality as possible. High definition is preferred. The video can be of an object, which can also be person or any other item that can be recorded into an electronic format or medium.

A method to manipulate a view of a video file of an object while the video file is playing comprising:
a. capturing images of the object using a video camera to a first video file;
b. setting a beginning point and an end point of the first video file;
c. converting said first video file to a second video file;
d. providing a video player viewer for displaying said video file; said video player viewer having a main imaging area, at least one thumbnail button for an alternative view of said video file, a video progress display, a play/pause button, and a zoom control button;
e. importing the second video file into an interactive computing software program;
f. setting video parameters for height and width of the second video format to create a third video file;
g. placing said third video file in the video player viewer;
h. setting video-viewing parameters for height and width in the video player viewer;
i. setting axis points based on the height and the width for at least one target zoom point, at least one key frame and a pointer control;
j. creating at least one target image for the alternative view of said third video file and for the at least one zoom point.
k. placing the at least one target image in the video player viewer and setting X, Y axis coordinates and zoom scale for said at least one target image;
l. linking the player/pause button and the progress bar with said third video file for video playback control;
m. setting at least two zoom parameters for "zoom in" and "zoom out" buttons of said third video file;
n. exporting the video player and the third video file as an Internet Web browser viewable file; and
o. uploading the third video file to an Internet web page server;
whereby while the third video file is playing, a user can manipulate the view of the video file of the object by zooming in and out and moving the location of said viewer around the moving images of the third video file.

An apparatus for viewing a video file of a subject comprising:
a video player viewer for displaying said video file; said video player viewer having a main imaging area, at least one thumbnail button for an alternative view of said video file, a video progress display, a play/pause button, and a zoom control button;
said video file undergoing the following steps:
a. setting a beginning point and an end point of the video file to create a first video file;
b. converting said first video file to a second video file;
c. importing the second video file into an interactive computing software program;
d. setting video parameters for height and width of the second video format to create a third video file;
e. placing said third video file in the video player viewer;
f. setting video-viewing parameters for height and width in the video player viewer;
g. setting axis points based on the height and the width for at least one target zoom point, at least one key frame and a pointer control;
h. creating at least one target image for the alternative view of said third video file and for the at least one zoom point.
i. placing the at least one target image in the video player viewer and setting X, Y axis coordinates and zoom scale for said at least one target image;
j linking the player/pause button and the progress bar with said third video file for video playback control;
k. setting at least two zoom parameters for "zoom in" and "zoom out" buttons of said third video file;
l. exporting the video player and the third video file as an Internet Web browser viewable file; and
m. uploading the third video file to an Internet web page server;
whereby while the third video file is playing, a user can manipulate the view of the video file of the subject by zooming in and out and moving the location of said viewer around the moving images of the third video file.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

We claim:

1. A method to manipulate a view of a video file of an object while the video file is playing comprising:
   a. capturing images of the object using a video camera to a first video file;
   b. setting a beginning point and an end point of the first video file;
   c. converting said first video file to a second video file;
   d. providing a video player viewer for displaying said video file; said video player viewer having a main imaging area, at least one thumbnail button for an alternative view of said video file, a video progress display, a play/pause button, and a zoom control button;
   e. importing the second video file into an interactive computing software program;
   f. setting video parameters for height and width of the second video format to create a third video file;
   g. placing said third video file in the video player viewer;
   h. setting video-viewing parameters for height and width in the video player viewer;
   i. setting axis points based on the height and the width for at least one target zoom point, at least one key frame and a pointer control;
   j. creating at least one target image for the alternative view of said third video file and for the at least one zoom point;
   k. placing the at least one target image in the video player viewer and setting X, Y axis coordinates and zoom scale for said at least one target image;
   l. linking the player/pause button and the progress bar with said third video file for video playback control;
   m. setting at least two zoom parameters for "zoom in" and "zoom out" buttons of said third video file;
   n. exporting the video player and the third video file as an Internet Web browser viewable file; and
   o. uploading the third video file to an Internet web page server;
      whereby while the third video file is playing, a user can manipulate the view of the video file of the object by zooming in and out.

2. A method to manipulate a view of a video file of an object while the video file is playing comprising:
   a. capturing images of the object using a data gathering device to a first video file;
   b. setting a beginning point and an end point of the first video file;
   c. converting said first video file to a second video file;
   d. providing a video player viewer for displaying said video file; said video player viewer having a main imaging area, at least one thumbnail button for an alternative view of said video file, a play/pause button, and a zoom control button;
   e. importing the second video file into an interactive computing software program;
   f. setting video parameters for height and width of the second video format to create a third video file;
   g. placing said third video file in the video player viewer;
   h. setting video-viewing parameters for height and width in the video player viewer;
   i. setting axis points based on the height and the width for at least one target zoom point, at least one key frame and a pointer control;
   j. creating at least one target image for the alternative view of said third video file and for the at least one zoom point;
   k. placing the at least one target image in the video player viewer and setting X, Y axis coordinates and zoom scale for said at least one target image;
   l. linking the player/pause button and the progress bar with said third video file for video playback control;
   m. setting at least two zoom parameters for "zoom in" and "zoom out" buttons of said third video file;
      whereby while the third video file is playing, a user can manipulate the view of the video file of the object by zooming in and out.

3. The method of claim 2 wherein the video player viewer further comprises a video progress display.

4. The method of claim 2 further comprising the steps of exporting the video player and the third video file as an Internet Web browser viewable file; and uploading the third video file to an Internet web page server.

5. An apparatus for viewing a video file of a subject comprising:
   a video player viewer for displaying said video file; said video player viewer having a main imaging area, at least one thumbnail button for an alternative view of said video file, a video progress display, a play/pause button, and a zoom control button;
   said video file undergoing the following steps:
   a. setting a beginning point and an end point of the video file to create a first video file;
   b. converting said first video file to a second video file;
   c. importing the second video file into an interactive computing software program;
   d. setting video parameters for height and width of the second video format to create a third video file;
   e. placing said third video file in the video player viewer;
   f. setting video-viewing parameters for height and width in the video player viewer;
   g. setting axis points based on the height and the width for at least one target zoom point, at least one key frame and a pointer control;
   h. creating at least one target image for the alternative view of said third video file and for the at least one zoom point;
   i. placing the at least one target image in the video player viewer and setting X, Y axis coordinates and zoom scale for said at least one target image;
   j linking the player/pause button and the progress bar with said third video file for video playback control;
   k. setting at least two zoom parameters for "zoom in" and "zoom out" buttons of said third video file;
   l. exporting the video player and the third video file as an Internet Web browser viewable file; and
   m. uploading the third video file to an Internet web page server;
      whereby while the third video file is playing, a user can manipulate the view of the video file of the subject by zooming in and out.

\* \* \* \* \*